United States Patent
Siokos et al.

(10) Patent No.: US 11,173,913 B2
(45) Date of Patent: Nov. 16, 2021

(54) PREDICTIVE ENGINE CONTROL METHODOLOGY FOR MANAGING WHEEL SLIP IN THROUGH-THE-ROAD HYBRID VEHICLES

(71) Applicant: FCA US LLC, Auburn Hills, MI (US)

(72) Inventors: Konstantinos Siokos, Rochester Hills, MI (US); Sandeep Makam, Rochester Hills, MI (US); Yang Liang, Troy, MI (US); Jiamu Hu, Rochester Hills, MI (US); Lurun Zhong, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 315 days.

(21) Appl. No.: 16/270,012

(22) Filed: Feb. 7, 2019

(65) Prior Publication Data

US 2020/0255017 A1  Aug. 13, 2020

(51) Int. Cl.
*B60W 30/18* (2012.01)
*B60K 6/26* (2007.10)
(Continued)

(52) U.S. Cl.
CPC ......... *B60W 30/18172* (2013.01); *B60K 6/26* (2013.01); *B60K 6/52* (2013.01); *B60W 10/06* (2013.01); *B60W 10/08* (2013.01); *B60W 10/119* (2013.01); *B60W 20/10* (2013.01); *B60K 2006/268* (2013.01); *B60W 2520/10* (2013.01); *B60W 2520/125* (2013.01); *B60W 2520/14* (2013.01); *B60W 2520/263* (2013.01); *B60W 2520/28* (2013.01); *B60W 2530/10* (2013.01);
(Continued)

(58) Field of Classification Search
CPC ........... B60W 30/18172; B60W 10/06; B60W 10/08; B60W 10/119; B60W 20/10; B60W 2520/10; B60W 2520/125; B60W 2520/14; B60W 2520/263; B60W 2520/28; B60W 2530/10; B60W 2540/18; B60W 2710/0666; B60K 6/26; B60K 6/52; B60K 2006/268
See application file for complete search history.

(56) References Cited

U.S. PATENT DOCUMENTS 7,021,409 B2  4/2006 Tamor
7,314,424 B2  1/2008 Supina et al.
(Continued)

FOREIGN PATENT DOCUMENTS

EP  0226472 A2 *  6/1987  ............. B60T 8/322

*Primary Examiner* — Geepy Pe
*Assistant Examiner* — Daniel Tyler Reich
(74) *Attorney, Agent, or Firm* — Ralph E. Smith

(57) ABSTRACT

Techniques for managing wheel slip in a through-the-road hybrid vehicle comprise detecting a front wheel slip event based on measured rotational speeds of front wheels, determining a likelihood of a subsequent rear wheel slip event, when the front wheel slip event has ended and the likelihood of the subsequent rear wheel slip event satisfies a calibratable threshold, adjusting a front/rear axle torque split and pre-loading at least one of an engine and a belt-driven starter generator (BSG) unit coupled to a crankshaft of the engine to compensate for a torque drop that is predicted to occur during the rear wheel slip event, and re-adjusting the front/rear axle torque split and pre-unloading at least one of the engine and the BSG unit such that a drop in torque output at a front axle aligns with an end of the rear wheel slip event.

14 Claims, 3 Drawing Sheets

(51) Int. Cl.
*B60K 6/52* (2007.10)
*B60W 10/06* (2006.01)
*B60W 10/08* (2006.01)
*B60W 10/119* (2012.01)
*B60W 20/10* (2016.01)

(52) U.S. Cl.
CPC . *B60W 2540/18* (2013.01); *B60W 2710/0666* (2013.01); *B60W 2710/083* (2013.01); *B60W 2720/403* (2013.01); *B60Y 2200/92* (2013.01); *B60Y 2400/82* (2013.01)

(56) References Cited

U.S. PATENT DOCUMENTS

| | | | |
|---|---|---|---|
| 7,407,026 B2 | 8/2008 | Tamor | |
| 8,453,770 B2 * | 6/2013 | Tang | B60L 15/2036 |
| | | | 180/65.1 |
| 8,700,280 B2 * | 4/2014 | Nozu | B60K 17/35 |
| | | | 701/69 |
| 8,751,131 B2 * | 6/2014 | Reynolds | B60T 8/17616 |
| | | | 701/84 |
| 9,573,595 B2 * | 2/2017 | Fairgrieve | B60W 30/18172 |
| 2010/0038158 A1 * | 2/2010 | Whitney | B60W 30/16 |
| | | | 180/65.265 |
| 2015/0088356 A1 | 3/2015 | Sailer et al. | |
| 2015/0258984 A1 | 9/2015 | Atluri et al. | |
| 2017/0253143 A1 | 9/2017 | Tang | |

\* cited by examiner

PREDICTIVE ENGINE CONTROL METHODOLOGY FOR MANAGING WHEEL SLIP IN THROUGH-THE-ROAD HYBRID VEHICLES

FIELD

The present application generally relates to through-the-road hybrid vehicles and, more particularly, to a predictive engine control methodology for managing wheel slip in through-the-road hybrid vehicles.

BACKGROUND

Vehicles include a torque generating unit (e.g., an internal combustion engine) that generates drive torque. This drive torque is typically transferred to a front axle of the vehicle via a transmission (e.g., an automatic transmission), which is also known as front-wheel drive (FWD). The front axle is rotatably coupled to wheels/tires of the vehicle, which transfer the drive torque from the front axle to a road surface. In one type of through-the-road hybrid vehicle, the vehicle further includes an electric motor coupled to a rear axle. In a hybrid or parallel mode, both the engine/transmission and the electric motor are providing drive torque to their respective axles according to a desired total torque and a front/rear torque split. During wheel slipping scenarios, torque is requested from the non-slipping axle through appropriate torque split control. When rear axle wheel slip occurs during the hybrid mode, there is a torque drop due to a delay associated with actuating the engine, and this torque drop could be noticeable to a driver of the vehicle. Accordingly, while such vehicle drive systems work well for their intended purpose, there remains a need for improvement in the relevant art.

SUMMARY

According to one example aspect of the invention, a wheel slip management system for a through-the-road hybrid vehicle having an engine connected to a front axle of the vehicle and an electric motor connected to a rear axle of the vehicle is presented. In one exemplary implementation, the system comprises: a set of wheel speed sensors configured to measure rotational speeds of front wheels of the vehicle that are connected to the front axle and rear wheels that are connected to the rear axle of the vehicle and a control system configured to operate the vehicle in a hybrid mode during which both the engine and the electric motor are providing drive torque via the respective front and rear axles and, during the hybrid mode: detect a front wheel slip event based on the measured rotational speeds of the front wheels, determine a likelihood of a subsequent rear wheel slip event, when the front wheel slip event has ended and the likelihood of the subsequent rear wheel slip event satisfies a calibratable threshold, adjust a front/rear axle torque split and pre-load at least one of the engine and a belt-driven starter generator (BSG) unit coupled to a crankshaft of the engine to compensate for a torque drop that is predicted to occur during the subsequent rear wheel slip event, and re-adjust the front/rear axle torque split and pre-unload at least one of the engine and the BSG unit such that a drop in torque output at the front axle aligns with an end of the subsequent rear wheel slip event.

In some implementations, the control system is configured to pre-load the engine by increasing a torque output of the engine. In some implementations, the control system is configured to pre-load the BSG unit by increasing a torque output of an electric motor of the BSG unit. In some implementations, the control system does not increase the load of the engine or the BSG unit when the front wheel slip event is still occurring to prevent exacerbating the front wheel slip event.

In some implementations, the control system is further configured to estimate a start and duration of the subsequent rear wheel slip event based on front wheel slip information, vehicle wheelbase, vehicle speed, and vehicle weight distribution. In some implementations, the control system is configured to pre-load and pre-unload at least one of the engine and the BSG unit based on the estimated start and duration of the subsequent rear wheel slip event and a calibrated or tabulate engine response time map for different operating conditions.

In some implementations, the control system is further configured to determine the likelihood of the subsequent rear wheel slip event based on a current wheel track. In some implementations, the control system is further configured to calculate the current wheel track based on vehicle speed, steering wheel angle, yaw rate, and lateral acceleration. In some implementations, the likelihood of the subsequent rear wheel slip event represents a likelihood that the rear wheels will encounter a same road surface that caused the front wheel slip event as calculated based on the current wheel track.

According to another example aspect of the invention, a predictive engine control method for managing wheel slip in a through-the-road hybrid vehicle is presented. In one exemplary implementation, the method comprises: operating, by a control system of the vehicle, in a hybrid mode during which both an engine and an electric motor are providing drive torque via respective front and rear axles of the vehicle, wherein the engine is connected to the front axle of the vehicle and the electric motor is connected to the rear axle of the vehicle and during the hybrid mode: receiving, by the control system and from a set of wheel speed sensors, measured rotational speeds of front wheels of the vehicle that are connected to the front axle and rear wheels that are connected to the rear axle of the vehicle, detecting, by the control system, a front wheel slip event based on the measured rotational speeds of the front wheels, determining, by the control system, a likelihood of a subsequent rear wheel slip event, when the front wheel slip event has ended and the likelihood of the subsequent rear wheel slip event satisfies a calibratable threshold, adjusting a front/rear axle torque split and pre-loading, by the control system, at least one of the engine and a belt-driven starter generator (BSG) unit coupled to a crankshaft of the engine to compensate for a torque drop that is predicted to occur during the subsequent rear wheel slip event, and re-adjusting the front/rear axle torque split and pre-unloading, by the control system, at least one of the engine and the BSG unit such that a drop in torque output at the front axle aligns with an end of the subsequent rear wheel slip event.

In some implementations, pre-loading the engine comprises increasing a torque output of the engine. In some implementations, pre-loading the BSG unit comprises increasing a torque output of an electric motor of the BSG unit. In some implementations, the method further comprises not increasing, by the control system, the load of the engine or the BSG unit when the front wheel slip event is still occurring to prevent exacerbating the front wheel slip event.

In some implementations, the method further comprises estimating, by the control system, a start and duration of the subsequent rear wheel slip event based on front wheel slip information, vehicle wheelbase, vehicle speed, and vehicle weight distribution. In some implementations, the pre-loading and pre-unloading of at least one of the engine and the BSG unit is based on the estimated start and duration of the subsequent rear wheel slip event and a calibrated or tabulated engine response time map for different operating conditions.

In some implementations, the method further comprises determining, by the control system, the likelihood of the subsequent rear wheel slip event based on a current wheel track. In some implementations, the method further comprises calculating, by the control system, the current wheel track based on vehicle speed, steering wheel angle, yaw rate, and lateral acceleration. In some implementations, the likelihood of the subsequent rear wheel slip event represents a likelihood that the rear wheels will encounter a same road surface that caused the front wheel slip event as calculated based on the current wheel track.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, rear wheel slip during a hybrid or parallel mode of a through-the-road hybrid vehicle (also known as an electrically all-wheel drive, or eAWD hybrid vehicle) causes a torque drop that could be noticeable to a driver of the vehicle. This torque drop is due to the delay associated with actuating the engine when torque split is delivered to the front axle. More specifically, as the vehicle is moving forward, the rear wheels, which are being powered by the electric motor, experience the wheel slip after the front wheels, where the engine is connected. When the rear wheel slip is detected, the rear torque request is reduced and additional torque is requested from the engine. During this period, and until the engine picks up the additional load, there is a torque drop caused by the rear wheel slip.

Accordingly, techniques are presented for predictive engine control to manage wheel slip. These techniques detect a front wheel slip event and pre-load the engine in anticipation of a rear wheel slip event such that it is ready to take up the load when the rear wheel slip event occurs. When the front wheel slip event does not end before the rear wheel slip event occurs, the engine is not pre-loaded because actuation of the engine while the front wheel slip event is still occurring could exacerbate the wheel slippage. In some implementations, the current wheel track is observed to determine a likelihood that the rear wheels will experience the same road surface as the front wheels. When this likelihood does not satisfy a threshold, the engine is not pre-loaded because the rear wheel slip event is not likely to occur.

Figure 1:
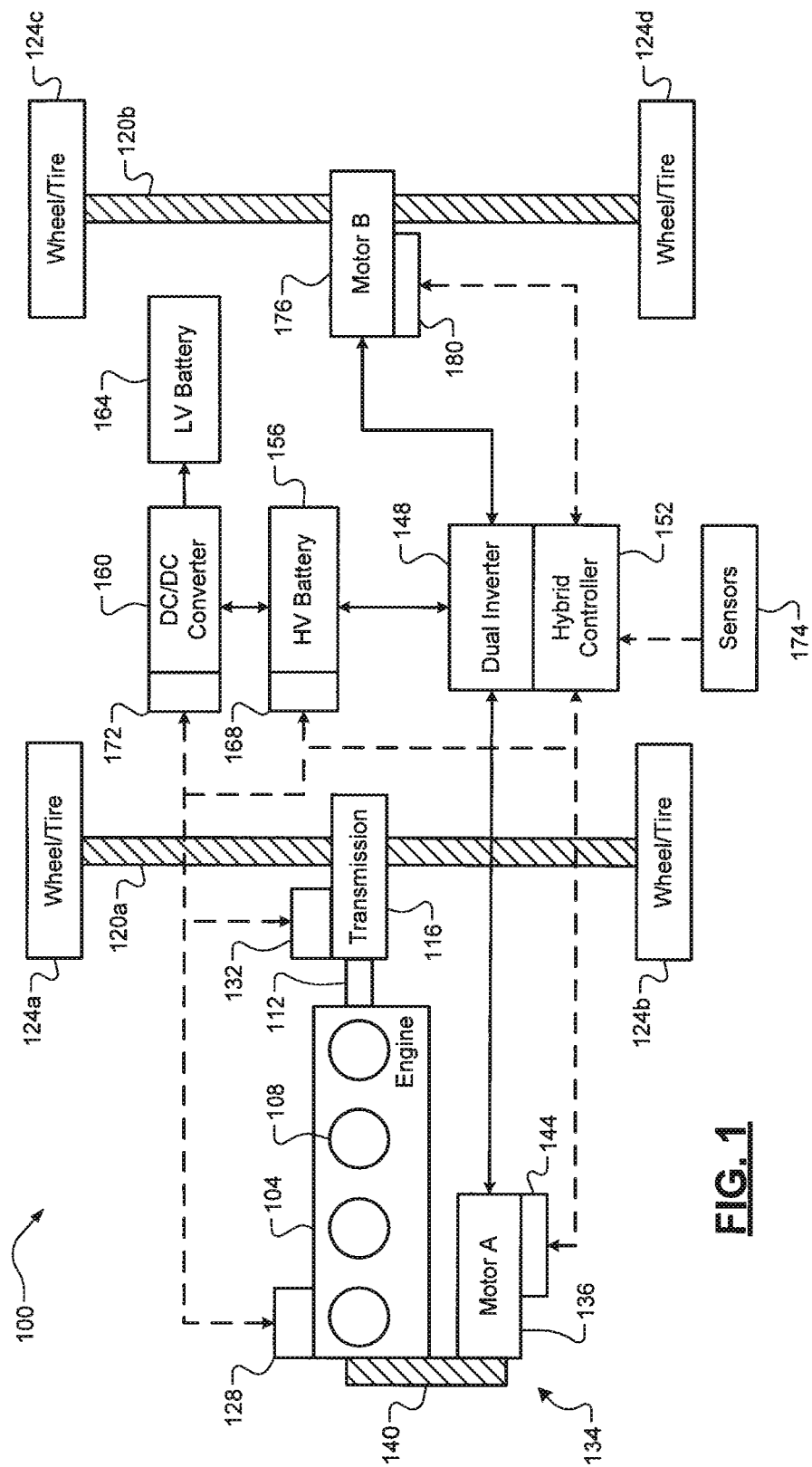
FIG. 1 illustrates a schematic diagram of an example through-the-road hybrid vehicle according to the principles of the present disclosure.

Referring now to FIG. 1, an exemplary configuration of a through-the-road hybrid vehicle 100 is illustrated. It will be appreciated that this is merely one example vehicle configuration and the techniques of the present disclosure could be applicable to any through-the-road or eAWD powertrain having an engine connected to the front axle and an electric motor connected to the rear axle. The vehicle 100 includes an internal combustion engine 104 that is configured to combust a mixture of air and fuel within cylinders 108 to drive pistons (not shown) that generate drive torque at a crankshaft 112. While only four cylinders are shown, it will be appreciated that the engine 104 could include any suitable number of cylinders. The drive torque at the crankshaft 112 is transferred by a transmission 116 to a front axle 120a of the vehicle 100. The front axle 120a is in turn connected to front wheels/tires 124a, 124b. The engine 104 is controlled by a respective control unit/module 128, and the transmission 116 is controlled by a respective control unit/module 132.

The engine 104 also includes an optional belt-driven starter generator (BSG) unit 134 including an electric motor 136 ("Motor A") and a drive device 140 (e.g., a belt or chain) that couples the electric motor 136 to the crankshaft 112. The electric motor 136 is capable of acting both as a torque provider by providing torque to the crankshaft 112 (e.g., to start the engine 104) and a torque consumer by converting a portion of the drive torque at the crankshaft 112 into electrical energy. The BSG unit 134 is capable of quickly starting the engine 104, such as in response to an electric-only to parallel mode transition being initiated. The BSG unit 134 could also be utilized to quickly increase the torque output at the front axle 120a as described in greater detail later on. The electric motor 136 is controlled by a respective control unit/module 144. The electric motor 136 either receives electrical energy from or provides electrical energy to a dual inverter 148. The dual inverter 148 is controlled by a respective hybrid controller 152.

This hybrid controller 152 also communicates with the other control modules/units such that the vehicle 100 generates a desired drive torque, e.g., based on a driver torque request. The dual inverter 148 is also connected to a high voltage (HV) battery 156. The dual inverter 148 converts alternating current (AC) (to/from the electric motor 136) into direct current (DC) (to/from the HV battery 156 and vice-versa. The HV battery 156 is connected to a DC-DC converter 160, which steps-down a voltage of the HV battery 156 to recharge a low voltage (LV) battery (e.g., a 12 volt lead-acid battery). The HV battery is controlled by a respective control unit/module 168 and the DC-DC converter 160 is controlled by a respective control unit/module 172, both of which are also in communication with the hybrid controller 152. The hybrid controller 152 also receives measurements from other sensors 174, such as, but not limited to, a front and rear wheel speed sensors, a vehicle speed sensor, a steering wheel angle sensor, a yaw rate sensor, and a lateral acceleration sensor.

The vehicle 100 further includes another electric motor 176 ("Motor B"). This electric motor 176 is also referred to as a traction motor because it provides drive torque to a rear axle 120b, which is in turn connected to rear wheels/tires 124c, 124d. It will be appreciated that the term "axle" as used herein includes a solid axle, half shafts, or any other suitable axle configuration. It will also be appreciated that the front and rear axles 120a, 120b could have the same axle configuration or different axle configurations. The electric motor 176 receives electrical energy (AC) from the dual inverter 148 in order to generate this drive torque. The electric motor 176 is controlled by a respective control module/unit 180, which is also in communication with the hybrid controller 152. It will be appreciated that these various controllers and control units/modules 128, 132, 152, 168, 172, 180 are collectively referred to herein as "a control system."

Figure 2:
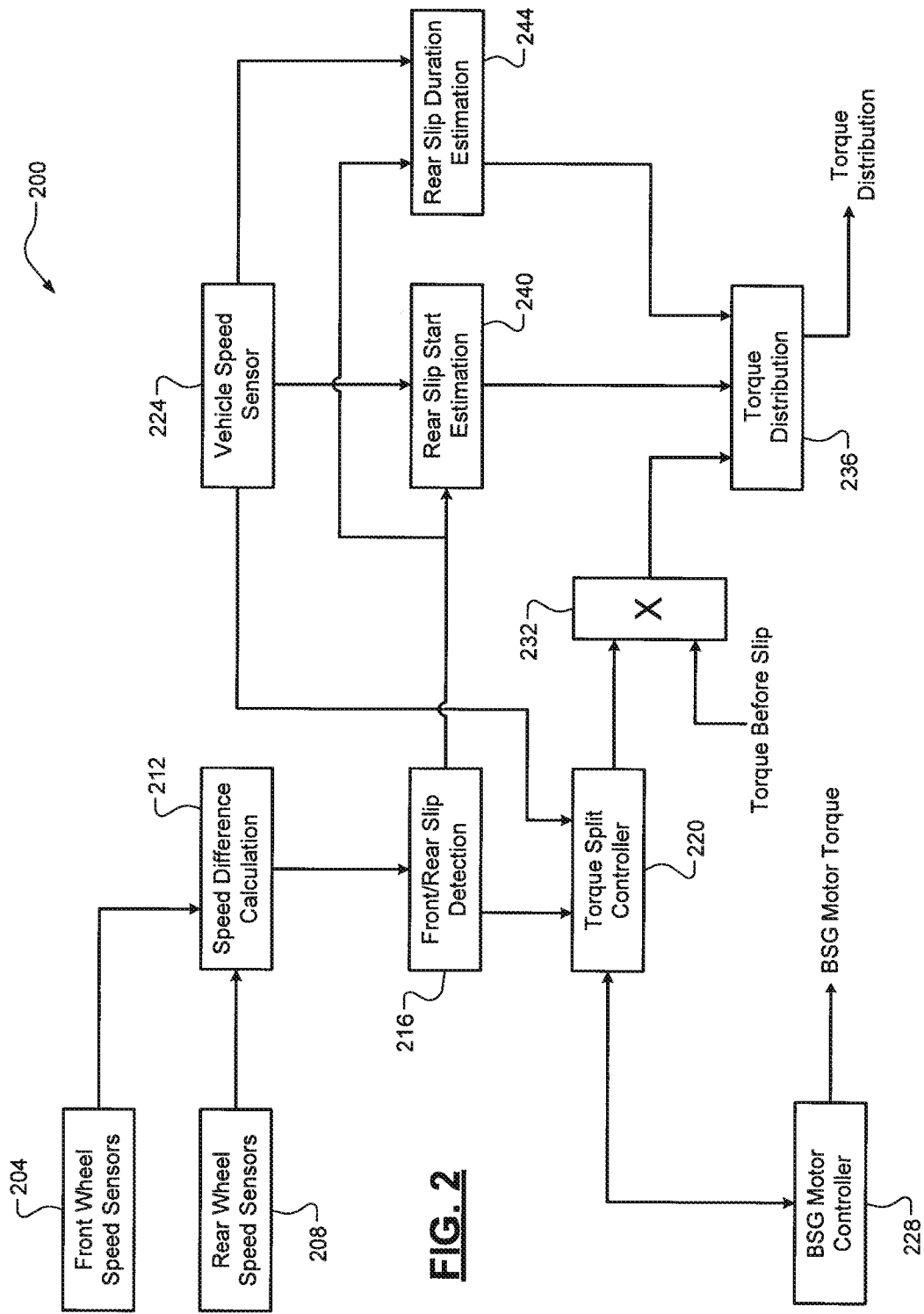
FIG. 2. illustrates a block diagram of an example wheel slip management architecture for the through-the-road hybrid vehicle according to the principles of the present disclosure.

Referring now to FIG. 2, a block diagram of an example wheel slip management architecture 200 for the through-the-road hybrid vehicle 100 is illustrated. Sets of front and rear wheel speed sensors 204, 208 measure rotational speeds of wheels 124a-124d. These sensors 204 and 208 could be part of the sensors 174 illustrated in FIG. 1. The wheel speeds of the front wheels 124a and 124b could differ, e.g., if one of the two wheels 124a and 124b was slipping and the other of the two wheels 124a and 124b was not slipping. A single front wheel speed could be determined, e.g., by averaging the front wheel speeds. Similarly, a single rear wheel speed could be determined for the rear wheels 124c and 124d, e.g., by averaging the rear wheel speeds. At 212, a speed difference calculation is performed. More specifically, a difference between the front wheel speed and the rear wheel speed is calculated. This calculated difference is fed to 216 where rear slip or front slip is detected. For example, the calculated difference could be compared to one or more calibratable thresholds. In one exemplary implementation, rear slip is detected when the calculated difference is less than a negative speed difference threshold and front slip is detected when the calculated difference is greater than a positive speed difference threshold. The detection of rear slip or front slip is then fed to a torque split controller 220.

A vehicle speed sensor 224 measures a speed of the vehicle 100. The vehicle speed is also fed to the torque split controller 220, and optionally to a torque controller 228 for the motor of the BSG unit 134 (Motor A 136). This controller 228 controls the BSG unit 134, such as controlling Motor A 136 to generate torque at the crankshaft 112. The torque split controller 220 determines a torque split between the front and rear axles 120a and 120b for maintaining a constant total torque provided the driver does not change his/her acceleration request. Both controllers 220 and 228 could utilize a desired vehicle speed (e.g., based on driver input) as a target feedback value. This value and a total torque before slip (a constant value) are fed into a multiplier 232 that multiplies the values (e.g., by a calibratable multiplier). The multiplied value is fed to a torque distribution block 236. Also fed to the torque distribution block 236 is an estimation from 240 of when rear slip will begin (after front slip is detected at 216). This estimation could be based on, for example, a length of the vehicle's wheelbase and the vehicle speed from sensor 224. This could be further based on front wheel slip information (degree of slip, start time, etc.). Also fed to the torque distribution block 236 is an estimation from 244 of the duration of the rear slip. For example, this could be equal to a duration of the detected front slip or a function of it based on vehicle weight distribution (front/rear, left/right, etc.) and the vehicle speed from sensor 224. This could also be based on the front wheel slip information. Based on all of these inputs, along with a calibrated or tabulated engine response time map for different operating conditions (e.g., how long the engine takes to response for various operating conditions of the vehicle), the torque distribution block 236 determines whether to pre-load the engine 104 and/or Motor A 136 of the BSG unit 134, the timing, and total torque to be distributed to the front axle 120a.

Figure 3:
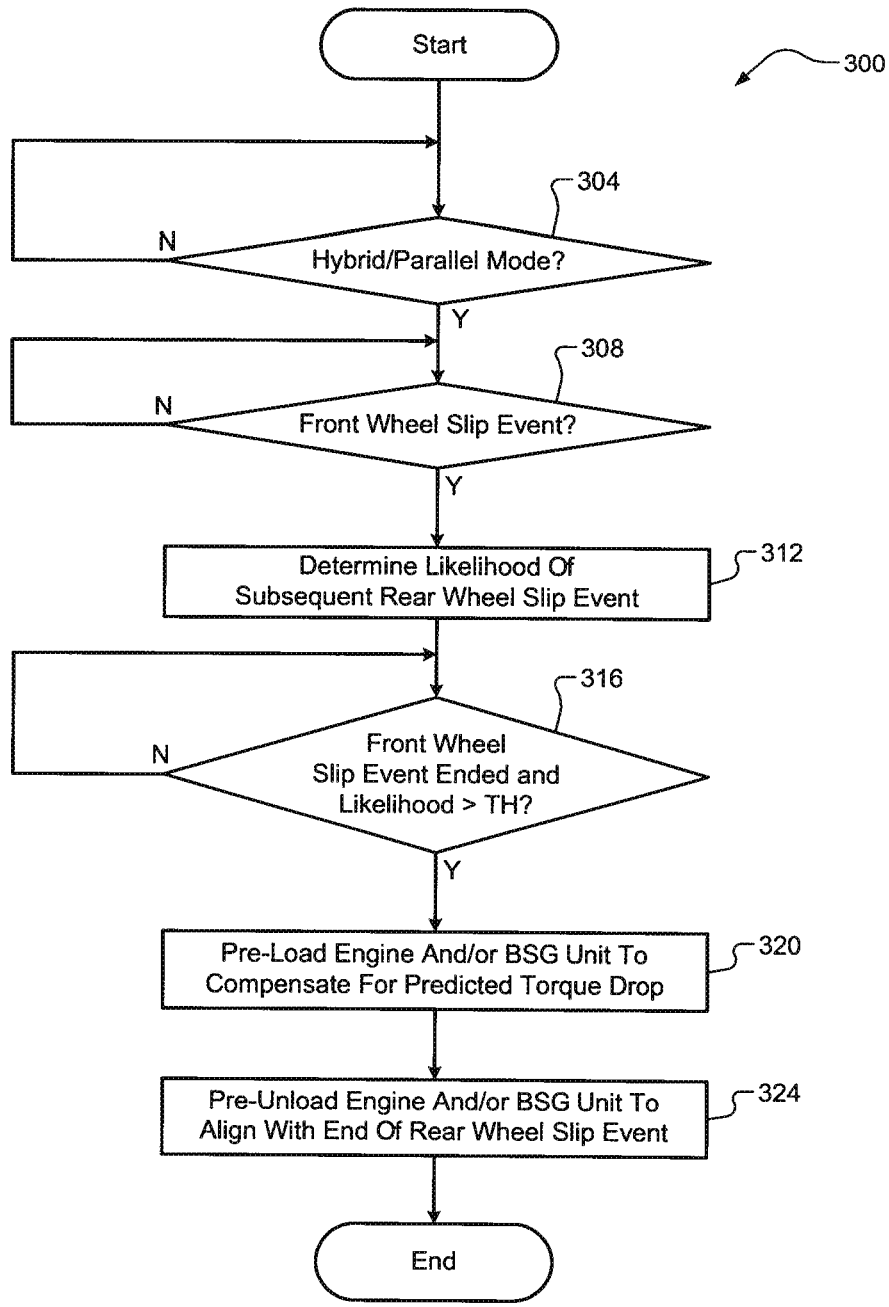
FIG. 3 illustrates a flow diagram of an example predictive engine control method for managing wheel slip in a through-the-road hybrid vehicle according to the principles of the present disclosure.

Referring now to FIG. 3, a flow diagram of an example predictive engine control method 300 for managing wheel slip in a through-the-road hybrid vehicle (e.g., vehicle 100) is illustrated. At 304, the control system (e.g., controller 116) determines whether the vehicle 100 is operating in the hybrid or parallel mode where both the engine 104 and the electric motor 176 are providing drive torque via their respective front and rear axles 120a and 120b. When true, the method 300 proceeds to 308. Otherwise, the method 300 ends or returns to 304. At 308, the control system determines whether a front wheel slip event has begun to occur. This determination is based on, for example, wheel speed measurements from the front wheel speed sensors 204. When true, the method 300 proceeds to 312. Otherwise, the method 300 ends or returns to 308.

At 312, the control system determines a likelihood of a subsequent rear wheel slip event. This could be based, for example, on a current wheel track. For example, the vehicle 100 could be in the process of performing a sharp turn after the front wheel slip event begins, which could affect the likelihood of whether the rear wheels 124c, 124d will encounter the same road surface that caused the front wheel slip event. In one exemplary implementation, the control system is configured to calculate the current wheel track of the vehicle 100 based on vehicle speed, steering wheel angle, yaw rate, and lateral acceleration (e.g., from sensors 174). It will be appreciated that various combinations of these inputs and/or other inputs could be used to determine the current wheel track. In this exemplary implementation, the control system could then calculate the likelihood that the rear wheels 124c, 124d will encounter the same road surface that caused the front wheel slip event based on the calculated current wheel track.

At 316, the control system determines whether the front wheel slip event has ended and the likelihood of the subsequent rear wheel slip event occurring satisfies a calibratable threshold (TH). When both are true, the method proceeds to 316. Otherwise, the method 300 ends or returns to 316. When the front wheel slip event has not yet ended, it would be undesirable to pre-load the engine 104 and/or the BSG unit 134 because this could exacerbate the front wheel slip event. For example only, a very long front wheel slip event could occur on a large patch of icy road that exceeds the length of the vehicle's wheelbase. At 320, the control system pre-loads the engine 104 and/or Motor A 136 of the BSG unit 134 to compensate for a predicted torque drop caused by the subsequent rear wheel slip event. Finally, at 324, the control system re-adjusts the torque split and pre-unloads the engine 104 and/or Motor A 136 of the BSG unit 134 such that a drop in torque output at the front axle 120a aligns with an end of the rear wheel slip event (and thus a corresponding torque increase at the rear axle 120b). Similar to the engine/BSG loading alignment, this engine/BSG unloading is aligned with the end of the rear wheel slip event to predictively account for similar engine actuation lags. The method 300 then ends or returns to 304.

As previously mentioned herein, it will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A wheel slip management system for a through-the-road hybrid vehicle having an engine connected to a front axle of the vehicle and an electric motor connected to a rear axle of the vehicle, the system comprising:
   a set of wheel speed sensors configured to measure rotational speeds of front wheels of the vehicle that are connected to the front axle and rear wheels that are connected to the rear axle of the vehicle; and
   a control system configured to operate the vehicle in a hybrid mode during which both the engine and the electric motor are providing drive torque via the respective front and rear axles and, during the hybrid mode:
      detect a front wheel slip event based on the measured rotational speeds of the front wheels,
      determine a likelihood of a subsequent rear wheel slip event,
      when the front wheel slip event has ended and the likelihood of the subsequent rear wheel slip event satisfies a calibratable threshold:
         estimate a start and duration of the subsequent rear wheel slip event based on front wheel slip information, vehicle wheelbase, vehicle speed, and vehicle weight distribution, and
         adjust a front/rear axle torque split and pre-load at least one of the engine and a belt-driven starter generator (BSG) unit coupled to a crankshaft of the engine to compensate for a torque drop that is predicted to occur during the subsequent rear wheel slip event, and
      re-adjust the front/rear axle torque split and pre-unload at least one of the engine and the BSG unit such that a drop in torque output at the front axle aligns with an end of the subsequent rear wheel slip event,
      wherein the control system is configured to pre-load and pre-unload at least one of the engine and the BSG unit based on the estimated start and duration of the subsequent rear wheel slip event and a calibrated or tabulated engine response time map for different operating conditions.

2. The system of claim 1, wherein the control system is further configured to determine the likelihood of the subsequent rear wheel slip event based on a current wheel track.

3. The system of claim 2, wherein the control system is further configured to calculate the current wheel track based on vehicle speed, steering wheel angle, yaw rate, and lateral acceleration.

4. The system of claim 2, wherein the likelihood of the subsequent rear wheel slip event represents a likelihood that the rear wheels will encounter a same road surface that caused the front wheel slip event as calculated based on the current wheel track.

5. The system of claim 1, wherein the control system is configured to pre-load the engine by increasing a torque output of the engine.

6. The system of claim 1, wherein the control system is configured to pre-load the BSG unit by increasing a torque output of an electric motor of the BSG unit.

7. The system of claim 1, wherein the control system does not increase the load of the engine or the BSG unit when the front wheel slip event is still occurring to prevent exacerbating the front wheel slip event.

8. A predictive engine control method for managing wheel slip in a through-the-road hybrid vehicle, the method comprising:
   operating, by a control system of the vehicle, in a hybrid mode during which both an engine and an electric motor are providing drive torque via respective front and rear axles of the vehicle, wherein the engine is connected to the front axle of the vehicle and the electric motor is connected to the rear axle of the vehicle; and
   during the hybrid mode:
      receiving, by the control system and from a set of wheel speed sensors, measured rotational speeds of front wheels of the vehicle that are connected to the front axle and rear wheels that are connected to the rear axle of the vehicle;
      detecting, by the control system, a front wheel slip event based on the measured rotational speeds of the front wheels;
      determining, by the control system, a likelihood of a subsequent rear wheel slip event;
      when the front wheel slip event has ended and the likelihood of the subsequent rear wheel slip event satisfies a calibratable threshold:
         estimating, by the control system, a start and duration of the subsequent rear wheel slip event based on front wheel slip information, vehicle wheelbase, vehicle speed, and vehicle weight distribution, and
         adjusting, by the control system, a front/rear axle torque split and pre-loading, by the control system, at least one of the engine and a belt-driven starter generator (BSG) unit coupled to a crankshaft of the engine to compensate for a torque drop that is predicted to occur during the subsequent rear wheel slip event; and
      re-adjusting, by the control system, the front/rear axle torque split and pre-unloading, by the control system, at least one of the engine and the BSG unit such that a drop in torque output at the front axle aligns with an end of the subsequent rear wheel slip event,
      wherein the pre-loading and pre-unloading of at least one of the engine and the BSG unit is based on the estimated start and duration of the subsequent rear wheel slip event and a calibrated or tabulated engine response time map for different operating conditions.

9. The method of claim 8, further comprising determining, by the control system, the likelihood of the subsequent rear wheel slip event based on a current wheel track.

10. The method of claim 9, further comprising calculating, by the control system, the current wheel track based on vehicle speed, steering wheel angle, yaw rate, and lateral acceleration.

11. The method of claim 9, wherein the likelihood of the subsequent rear wheel slip event represents a likelihood that the rear wheels will encounter a same road surface that caused the front wheel slip event as calculated based on the current wheel track.

12. The method of claim 8, wherein pre-loading the engine comprises increasing a torque output of the engine.

13. The method of claim 8, wherein pre-loading the BSG unit comprises increasing a torque output of an electric motor of the BSG unit.

14. The method of claim 8, further comprising not increasing, by the control system, the load of the engine or the BSG unit when the front wheel slip event is still occurring to prevent exacerbating the front wheel slip event.

* * * * *